Aug. 17, 1965  W. H. KINARD  3,200,706
GAS ACTUATED BOLT DISCONNECT
Filed Oct. 23, 1963
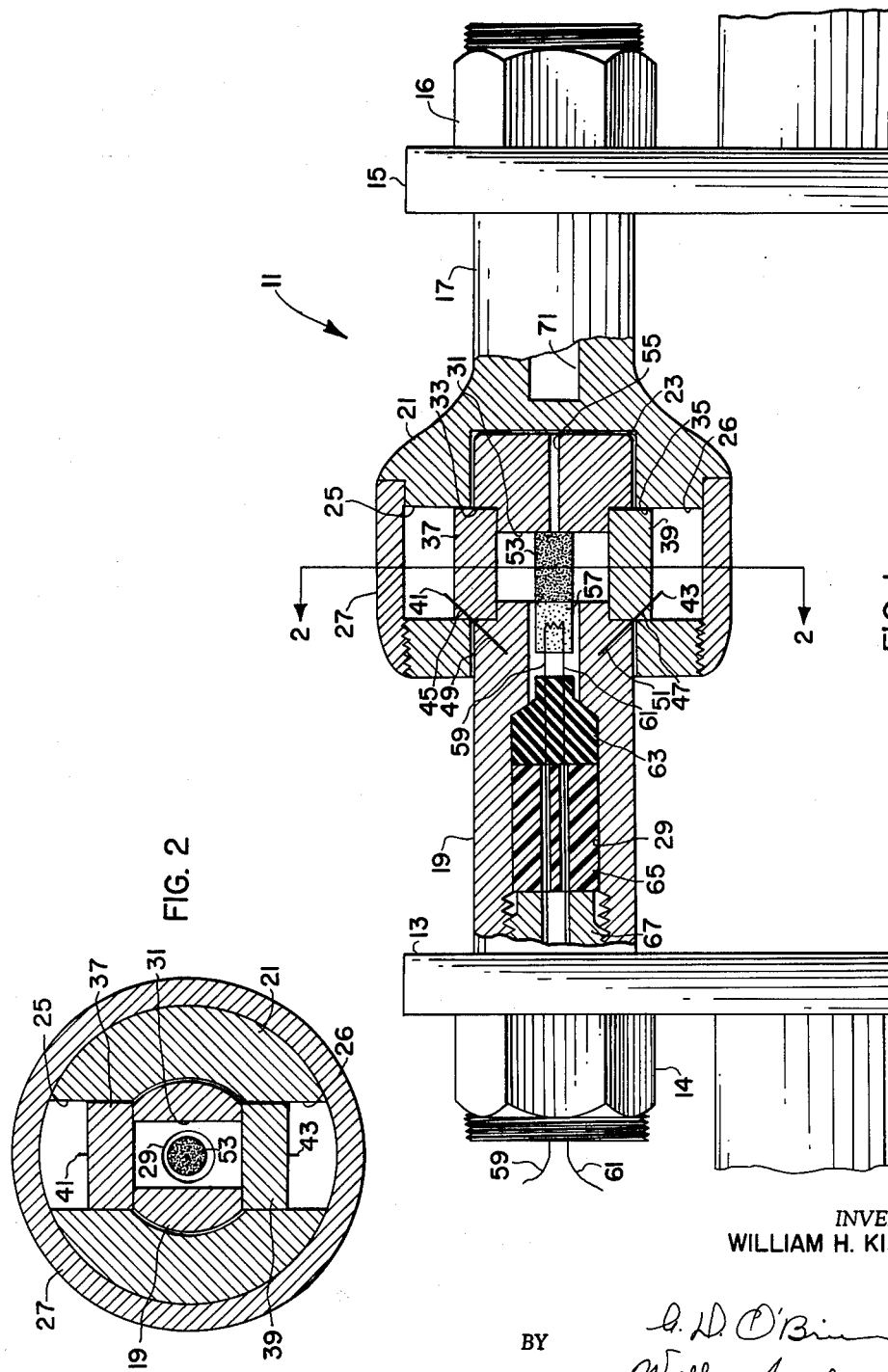
INVENTOR
WILLIAM H. KINARD
BY
*G. D. O'Brien*
*Wallace J. Nelson*
ATTORNEYS

United States Patent Office

3,200,706
Patented Aug. 17, 1965

3,200,706
GAS ACTUATED BOLT DISCONNECT
William H. Kinard, Williamsburg, Va., assignor to the United States of America as represented by the Administrator of the National Aeronautics and Space Administration
Filed Oct. 23, 1963, Ser. No. 318,443
10 Claims. (Cl. 89—1)
(Granted under Title 35, U.S. Code (1952), sec. 266)

The invention described herein may be manufactured and used by or for the Government of the United States of America for governmental purposes without the payment of any royalties thereon or therefor.

This invention relates to a connect and quick release mechanism and relates with particularity to a gas actuated bolt disconnect utilized for detachably securing two parts that are desired to be releasably connected. These parts may include, for example, a cable and weight, two ends of a tension cable used to connect a jettisonable satellite to a rocket propelling vehicle, or for connecting the various stages of a rocket vehicle, and the like.

When an explosive or gas actuated disconnect device is used to connect stages of a rocket vehicle, or to connect a jettisonable satellite structure to a rocket vehicle, it is imperative that the disconnection therebetween be quick and without any danger of gaseous or explosively propelled shrrapnel fragments or other debris interfering with the functioning of the separated devices. Presently known explosive bolt assemblies serving as release mechanisms usually have a hollow cross sectional interior with a relatively thin outer wall that is filled with a rapid burning or detonating explosive charge. Upon ignition, the thin wall section blows out violently separating the bolt ends and also subjecting surrounding structures to heavy blast loads and shrapnel impact. The detonating explosive charges used in this type of prior art disconnect assembly are usually of such force as to prohibit their use adjacent frangible, or delicate structure and instrumentation.

In addition, it has also been known to use linear shaped or hollow charge type explosive cords, as well as detonating fuse cords, such for example Primacord, for effecting separation of rocket or missile parts. Each of these prior art separation techniques results in shrapnel particles and explosively propelled debris which could cause irreparable damage, for example, when employed adjacent the frangible and delicate components of present and contemplated satellite structures that are to be jettisoned from a propelling vehicle for orbital flight.

In addition to the heretofore mentioned disadvantages of the presently available explosive bolts, a problem also exists when it is desirable or necessary to inactivate a connected bolt assembly, particularly when the assembly is connected adjacent frangible and delicate structure or instrumentation, due to the danger of accidental discharge or explosion of the bolt. Also, since the described prior art explosive bolt assemblies are loaded in substantially assembly-line fashion and delivered at the site of use in loaded condition, there is also the danger of explosion during transportation and during attachment of the connected parts thereto. Accordingly, there is a definite need in the art for a bolt disconnect assembly that can be used to safely connect and to promote quick and shrapnel-free disconnection between two parts connected thereby.

It is therefore an object of the present invention to provide a new and novel gas actuated bolt disconnect assembly.

Another object of the instant invention is the provision of a new bolt assembly capable of promoting quick disconnect between two connected parts without the danger of any shrapnel or explosively propelled debris damage to adjacent structure.

An additional object of the present invention is the provision of a gaseous actuated bolt disconnect that can be readily disassembled and safely inactivated.

A further object of the present invention is a novel method of on-site loading of a gaseous actuated bolt connect and disconnect assembly.

A still further object of the present invention is a method of safely inactivating a gaseous actuated bolt assembly when it is desired to remove the assembly from connected parts without gaseous actuated release thereof.

Yet another object of the present invention is the provision of a gas producing powder charged bolt assembly in which the gaseous charge forces are confined wholly within the assembly.

According to this invention, the foregoing and other objects are attained by providing a gaseous charge actuated bolt disconnect assembly including a substantially cylindrical male element attachable to one member of a connectible pair, a female element attachable to another member of the pair with the female element having an enlarged portion provided with an axial aperture therein for slidable receipt of the male element. The enlarged end portion of the female element is also provided with a diametrical through slot substantially intermediate the axial aperture therein and a removable cover enclosing the ends of the slot. The portion of the male element adapted to enter the axial cavity of the female element is provided with a diametrical perforation therethrough for alignment with the slot in the female element when the male element is received by the female element. A gas producing or deflagrating type powder charge is confined in the diametrical performation of the male element by a pair of slidable lock keys. These lock keys, which also serve to lock the male and female elements together, are attached in position by shear wires. The removable cover positioned about the enlarged end of the female element is in spaced relationship with the lock keys so as to limit movement of the lock keys upon actuation of the charge. A signal-responsive squib for igniting the powder charge is contained within the male member adjacent the confined charge with lead wires extending from the squib to a convenient signal-producing source located exterior of the bolt assembly.

A more complete appreciation of the invention and many of the attendant advantages thereof will be readily apparent as the same becomes better understood by reference to the following detailed description when considered in connection with the accompanying drawing, wherein:

FIG. 1 is a side elevational view, partly in section, showing the gaseous actuated bolt assembly according to the present invention, when attached to a pair of connectible parts.

FIG. 2 is a cross sectional view of the bolt assembly taken along line 2—2 of FIG. 1.

Referring now to the drawing and more particularly to FIG. 1, there is shown a bolt connect and disconnect assembly, generally designated by reference numeral 11, and attached at opposite ends thereof to a pair of connectible parts 13 and 15, respectively, by way of nuts 14 and 16. Parts 13 and 15 are used for illustration only and may be brackets on the end of two connectible cables, a cable and a weight, or any other like structure. Bolt assembly 11 consists primarily of a female element 17 and a substantially cylindrical male element 19. Female element 17 includes an enlarged end portion 21 having an axial cavity 23 therein for slidable receipt of a portion of male element 19. Enlarged end 21 is also provided with a pair of rectangular-shaped diametrically opposed slots 25 and 26 substantially intermediate the axial cavity or aperture 23. A removable ferrule or collar 27 is threadingly attached to enlarged end 21 of female element 17 so as to have portions thereof overlapping rectangular slots 25 and 26.

Male element 19 is provided with a stepped axial bore 29 extending throughout its length and having a diametrical perforation 31 adjacent the end thereof that is adapted to be received by female element 17. Diametrical perforation 31 is provided with enlarged ends forming key receptacles 33 and 35 of substantially the same size and peripheral configuration as the rectangular slots 25 and 26 in female element 17, with key receptacles 33 and 35 being adapted to communicate, respectively, with slots 25 and 26 when elements 17 and 19 are mated. A pair of substantially rectangular locking keys 37 and 39 are slidably positioned, respectively, through the ends of slots 25 and 26 to be partially received by key receptacles 33 and 35 so as to lock male element 19 in position within female element 17. Individual shear wires 41 and 43 are provided for securing the loose-fitting lock keys 37 and 39, respectively, in locked position. Shear wire 41 is frictionally fitted through lock key 37 by way of an angularly disposed small aperture 45 therein and terminates in an angularly disposed pinhole 49 which leads from male element 19 to the key receptacle 33. Shear wire 43 is frictionally fitted in a like manner through angular aperture 47 in lock key 39 and terminates in pinhole 51.

A small quantity of a conventional gas-producing powder charge 53 is confined within diametric perforation 31 by lock keys 37 and 39, as will be further explained hereinafter. A small diameter gas vent 55, forming part of the axial stepped bore 29 in male element 19, provides communication between the interior of cavity 23 and diametric perforation 31 containing powder charge 53, for purposes to be further described hereinafter.

A signal-responsive squib 57 is disposed in axial bore 29 adjacent powder charge 53 and is provided with a pair of electric lead wires 59 and 61 extending therefrom to a conventional electrical signal generating device, not shown. A compressible seal 63 formed of, for example neoprene, is disposed adjacent squib 57 for hermetically sealing axial bore 29 in male element 19 to prevent moisture and other contaminants from reaching squib 57 and powder charge 53. An incompressible apertured plug 65, formed of, for example a hard plastic, ceramic, or like material, is slidably disposed adjacent compressible seal 63 and adapted to abut against an externally threaded axial apertured closure 67. Closure 67 is threadingly received by the internal threaded portion of male element 19 and employed to compress seal 63 in sealed condition within axial bore 29. The end of closure 67 is provided with a suitable recess, not shown, for receipt of an appropriate tool, such for example a screwdriver, to permit installation of the closure in such manner as to leave a length of internal threads exposed in male element 19 for receipt of a connecting part when so needed or desired. Lead wires 59 and 61 extending from squib 57 pass through seal 63, plug 65, and closure 67 to a conventional electrical signal generating device, not shown.

*Operation*

When it is desired to separate a pair of elements 13 and 15 connected by bolt 11, an electrical pulse or signal is generated in a conventional manner by a suitable electric signal generator provided in electrical connection with squib wires 59 and 61, and not shown, to actuate signal-responsive squib 57 and thereby ignite the burnable gas-producing charge 53. The gas pressure produced from charge 53 acts against slidable lock keys 37 and 39 forcing each of them outwardly from the position as shown in FIG. 1 and FIG. 2, and simultaneously therewith shearing the shear wires 41 and 43. The outward movement of lock keys 37 and 39 is limited by ferrule 27 overlying the diametrically opposed slots 25 and 26. Any excess gas pressure produced from charge 53 is directed through vent 55 to the base of axial cavity 23 and assists in forcing male element 19 and female element 17 apart to release the connected parts 13 and 15.

It is thus seen that all the stress loads on bolt assembly 11 is initially taken up by lock keys 37 and 39 and, upon their expulsion from locked position, male element 19 and female element 17 are readily separable without any danger of shrapnel or explosively expelled debris to any surrounding or adjacent structure.

*On-site loading*

As mentioned hereinbefore, one of the prime advantages of the present invention over the explosive bolt assemblies presently known is the safe method of on-site loading to prevent the necessity of transporting explosively loaded assemblies to the site of use. On-site loading is readily accomplished in the present invention by attaching male element 19 to part 13 by threading nut 14 thereon, and then by attaching female element 17 to part 15 by way of nut 16. The male and female elements 17 and 19 are then brought into mating engagement with ferrule 27 being backed off from the enlarged end 21 of female element 17 so as to rest about male element 19. One of the lock key members, for example lock key 39, is then inserted through exposed slot 26 so as to be partially received by key receptacle 35 to lock male element 19 and female element 17 together. Lock key 39 is then secured in position by inserting frictionally fitted shear wire 43 through aperture 47 and pinhole 51. A burnable gas-producing charge 53, such for example a relatively large grain powder charge or a pellet of a gas-producing charge, may then be inserted through exposed slot 25 into the diametric bore 31 in male element 19 adjacent lock key 39.

The other lock key 37 is then slidably positioned within slot 25 so as to be partially received by key receptacle 33 in male element 19 and thereby confine powder charge 53 within perforation 31, while also serving to lock male element 19 within female element 17. Shear wire 41 is then frictionally fitted through angular aperture 45 in lock key 37 and into pinhole 49 in male element 19. Annular ferrule 27 is then threadingly secured about enlarged end 21 of female element 17 so as to close exposed slots 25 and 26 in spaced relationship with the lock keys 37 and 39. Also, as is readily apparent from the above described loading procedure, squib 57 may then be positioned within male element 19 with lead wires 59 and 61 passing through seal 62, plug 65, closure 67 and leading through the open end of male element 19 for attachment to a suitable electrical signal-producing device. Seal 63 and plug 65 slide into their respective positions as closure 67 is threadingly secured within male element 19.

When the nature of the connectible elements permits it, bolt 11 may be assembled unloaded with lock keys 37 and 39 and ferrule 27 in position prior to delivery of assembly 11 at the site of use. In this situation, axial bore 29 in male element 19 is empty and parts 13 and 15 are connected to bolt assembly 11 by nuts 14 and 16 in the same manner as described hereinbefore. A gas-producing pellet charge 53 is then adhesively bonded to squib 57, by any suitable conventional adhesive, and slidably loaded into position through axial bore 29 at the same time squib 57 is placed in position. The remaining loading operation then is accomplished by passing lead wires 59 and 61, leading from squib 57, through seal 63, plug 65 and closure 67 and threadingly securing closure 67 within male element 19, as described hereinbefore.

*Safe inactivation*

After bolt assembly 11 has been loaded and employed to connect parts 13 and 15 together, and it is subsequently determined necessary or desirable to disconnect these parts without actuating the explosive charge, this may also be readily accomplished within the teachings of the present invention, in the following manner. Ferrule 27 is backed off so as to rest about male element 19 to expose slots 25 and 26 and bring lock keys 37 and 39 into view. As evident in FIG. 1, shear wires 41 and 43 have exposed end portions extending beyond the lock keys 37 and 39 into the respective slots 25 and 26. Either of these shear wire extensions may then be grasped by a suitable tool, such for example a pair of nonconductive tweezers, and extracted from bolt assembly 11.

Inasmuch as shear wires 41 and 43 are frictionally fitted into their respective apertures and pinholes when installed, the respective lock keys 37 and 39 retained thereby will also be simultaneously extracted from slots 25 and 26 upon extraction of wires 41 and 43 from the assembly to thereby expose charge 53. Charge 53 may then be easily removed from diametric perforation 31 to thus inactivate the bolt assembly 11. When charge 53 is adhesively bonded to squib 57 as described hereinbefore, the charge pellet may be readily extracted through either slot 25 or slot 26 by suitable tweezers or a like force actuator sufficient to break the adhesive bond. The other lock key may then also be removed from its locking position by grasping its retaining shear wire and simultaneously therewith extracting the shear wire and lock key from locked position. The removal of lock keys 37 and 39, and powder charge 53 from the assembly thus permits male element 19 to be easily and slidably removed from female element 17 to thereby not only safely inactivative bolt assembly 11, but also permit safe manual separation of connected parts 13 and 15.

Also when charge 53 is in pellet form and adhesively bonded to squib 57, inactivation may readily be accomplished on-site and without disconnecting the connected parts 13 and 15 therefrom, in the following manner. Closure 67 is threadingly removed from male element 19 and, by exerting a slight pull on lead wires 59 and 61, squib 57 and the attached pellet charge 53 are slidably removed through axial bore 29 in male element 19. Subsequent release of parts 13 and 15 may then be safely accomplished by removing nuts 14 and 16 or by extracting lock keys 37 and 39, as described hereinabove.

The operational advantages and the adaptability of the herein described bolt connect and disconnect assembly will now be readily apparent, as will be the obviousness of utilizing the herein described invention in a signal-responsive quick disconnect system for safely connecting various types of structures including those adjacent to frangible or sensitive instrumentation and equipment.

Obviously many modifications and variations in the present invention are possible in the light of the above teachings. For example, it is readily apparent to those skilled in the art that where desired and with slight obvious modifications, an additional squib could be placed within axial cavity 71 in female element 17 so as to act through vent 55 and ignite charge 53 in the event of failure of squib 57. Also, in lieu of annular ferrule 27, it is also readily apparent that a pair of end caps could be constituted as closure means for the diametrically opposed slots 25 and 26 to permit ready access to the charge cavity while still functioning to limit the outward movement of lock keys 37 and 39. It is therefore to be understood that within the scope of the appended claims the invention may be practiced otherwise than as specifically described.

What is claimed as new and desired to be secured by Letters Patent of the United States is:

1. A bolt assembly for connecting and effecting sudden disconnection of two parts, comprising:
   a first member attached to one of the connected parts;
   a second member attached to the other connected part and having a length thereof received by said first member;
   a diametric perforation formed through said second member and provided with an individual key receptacle at each end thereof;
   a gas-producing charge disposed within said second member;
   a pair of diametrically opposed lock keys disposed in said receptacles for confining said charge within said second member and locking said first and second member together;
   a unitary ferrule disposed in circumferential engagement about said first member and in spaced adjacency with said pair of lock keys; and
   signal responsive means for initiating said charge to remove said pair of lock keys and release said first and second members;
   said ferrule serving to confine said lock keys completely within said assembly when said keys are removed from their lock position.

2. A bolt assembly for effecting sudden disconnection of two connected parts, comprising:
   a first member attached to one of the connected parts;
   a second member attached to the other connected part and having a portion thereof received by said first member;
   said first member being provided with a pair of diametrically opposed slots adjacent the portion thereof receiving said second member;
   said second member having a diametric perforation therethrough so constructed and arranged as to provide with the slots of said first member a communicating diametrical opening through the assembly when said second member is received by said first member;
   an individual receptacle formed at each end of the diametrical perforation of said second member;
   a gas-producing charge in the diametrical perforation of said second member;
   slidable lock means positionable within said first member through each slot thereof and received by said receptacles for confining said gas-producing charge within said second member and for locking said first and second members together;
   a unitary removable collar on said first member normally overlying the slots therein, but permitting access to the slots upon removal; and,
   means for initiating the confined charge to remove the slidable lock means and release said first and second members.

3. A signal-responsive quick disconnect for two connected parts, comprising:
   a first member attached to one part;
   a second member attached to another part;
   said first member having an enlarged end with an axial cavity therein for slidably receiving said second member;
   said first member further having a pair of diametrically opposed slots leading exteriorly therethrough from the axial cavity;
   a unitary removable ferrule on the enlarged end of said first member permitting access to said pair of slots;
   means forming a diametrical perforation in said second member so constructed and arranged as to communicate with said pair of slots in said first member;
   an individual receptacle formed at each end of the diametrical perforation;
   gas-producing means within the diametrical perforation of said second member;
   slidable lock means disposed within each said receptacle for initially confining said gas-producing means while also retaining said second member within the axial cavity of said first member;
   shearable means releasably attaching said slidable lock means to said second member; and
   signal-responsive means in said second member for initiating said gas-producing means to exert pressure on said slidable lock means thereby shearing said shearable means and separating said first and second members.

4. A signal-responsive quick disconnect as in claim 3 including:
vent means in said second member leading from the diametrical perforation therein to the base of the axial cavity in said first member and serving to direct excess gas pressure from said gas-producing means to assist in separating said first and second members.

5. A connect and quick disconnect gaseous actuated assembly for two connected parts and adapted for safe inactivation, comprising:
a first member attached to one part;
a second member attached to another part;
said first member having an enlarged end with an axial cavity therein for slidably receiving said second member;
said first member further having a pair of diametrically opposed slots leading from the axial cavity;
a removable ferrule on the enlarged end of said first member normally overlying said slots;
means forming a diametric perforation in said second member, an individual key receptacle formed at each end of said perforation and so constructed and arranged as to communicate with said slots in said first member;
a gas-producing charge within the diametric perforation of said second member;
slidable lock means disposed in said key receptacles for initially confining said gas-producing charge while also retaining said second member within the axial cavity of said first member;
shearable means releasably attaching said slidable means to said second member;
signal-responsive means for initiating said gas-producing charge to exert gas pressure on said slidable lock means to thereby shear said shearable means and separate said first and second members in the normal operation of the disconnect assembly; and whereby,
when it is desirable to safely inactivate the bolt, said ferrule may be removed to expose said lock means, and said lock means may then be extracted from lock position to expose and permit removal of said gas-producing charge through said slots.

6. A gaseous actuated bolt disconnect for a pair of connectible parts, comprising:
a substantially cylindrical male element attachable to one member of the connectible pair;
a female element attachable to another member of the connectible pair;
said female element having an enlarged end portion with an axial aperture therein for slidable receipt of a portion of said male element;
said enlarged end portion being provided with a pair of diametrically opposed slots substantially intermediate the axial aperture therein;
a unitary removable cover normally closing the ends said pair of slots in said female element;
said male element being provided with a stepped axial bore extending throughout its length;
the end of said male element attachable to one member of the connectible pair having both internal threads and external threads over a portion of the length thereof;
a diametric perforation extending through said male element and adapted to be alined with said slots in the female element;
an individual key receptacle formed at each end of said diametric perforation;
said key receptacles being substantially of the same size and configuration as the slots in said female element;
a pair of lock keys received within said key receptacles with parts thereof also extending into said slots so as to lock said male and female elements together; and,
means operable within said diametric perforation for expelling said lock keys from said key receptacles to release said male member from said female member.

7. A bolt disconnect as in claim 6 wherein said means for expelling said lock keys includes:
a signal-responsive squib positioned within the axial bore of said male member adjacent the diametric perforation therein;
a compressible seal adjacent said squib;
an incompressible, apertured plug slidably disposed adjacent said seal and extending toward the internal threaded portion of said male element;
an externally threaded axial apertured closure threadingly received by the internal threaded portion of said male element and in contacting engagement with said incompressible plug;
squib lead wires extending from said squib through said seal, said plug, and said closure; and
a gas-producing pellet charge adhesively secured to said squib and disposed within said diametric perforation.

8. A bolt disconnect as in claim 7 including:
retention means for normally securing said lock keys in position;
said retention means including;
(a) an individual angularly disposed pinhole leading from within said male element to each of said key receptacles;
(b) an angularly disposed aperture extending through each said lock key of substantially the same diameter as, and adapted for alinement with, said angular pinholes;
(c) shearable retaining wires frictionally fitted through said key apertures and terminating in said angularly disposed apertures for retaining said keys in locking position; whereby
upon signal-responsive actuation of said squib, said charge will be ignited and exert gas pressure on said keys to effect shearing of said retaining wires and expulsion of said keys from their lock position to thereby release said male element from said female element and disconnect the pair of connectible parts.

9. A powder-actuated bolt disconnect for a pair of connectible parts, comprising:
a substantially cylindrical male element attachable to one member of the connectible pair;
a female element attachable to another member of the connectible pair;
said female element having an enlarged end portion with an axial aperture therein for receipt of said male element;
said enlarged end portion being provided with a pair of diametrically opposed slots substantially intermediate the axial aperture therein;
a unitary tubular removable cover exteriorly closing said pair of slots in said female element;
said male element being provided with a stepped axial bore extending throughout its length;
a diametric perforation having a key receptacle formed at each end thereof extending diametrically through said male element and adapted to be alined with said slots;
the key receptacles of said male element perforation being of substantially the same size as said slots in the female element;
an electrical-responsive squib positioned within said male element adjacent said diametric perforation therein;
a compressible seal adjacent said squib;
an externally threaded and axial apertured closure threadingly received by said male element for compressing said seal to hermetically seal said squib in position;

squib lead wires extending from said squib through said seal and said closure;

a pair of locking keys slidably received respectively by said slots and said key receptacles so as to define a substantially closed cavity in said diametric perforation;

a gas-producing charge disposed within said diametric perforation between said locking keys;

shearable retaining wires extending through said lock keys into portions of said male element for retaining said keys in lock position; whereby, upon actuation of said squib, said charge will be ignited and exert gas pressure on said keys to effect shearing of said retaining wires and expulsion of said keys from their lock position to thereby release said male element from said female element and disconnect the pair of connectible parts.

10. A shrapnel and debris-free powder actuated bolt disconnect for a pair of connectible parts and adapted for shrapnel-free separation of the parts, comprising:

a substantially cylindrical male element attachable to one member of the connectible pair;

a female element attachable to another member of the connectible pair;

said female element having a relatively enlarged end portion with an axial aperture therein for slidable receipt of said male element;

said enlarged end portion being provided with a pair of diametrically opposed rectangular-shaped slots substantially intermediate the axial aperture therein;

a removable ferrule disposed about a portion of said enlarged end and overlapping the slots therein;

said male element being provided with a stepped axial bore extending throughout its length;

a diametric perforation extending through said male element;

a key receptacle at each end of said diametric perforation adapted to be alined with and of substantially the same peripheral configuration as said slots in the female element;

a signal-responsive squib positioned within said male element adjacent said perforation therein;

a pair of locking keys adapted to be slidably received by said slots in the female enlarged head and said alined key receptacles so as to define a substantially closed cavity in said male element perforation;

a gas-producing charge disposed within said male element in the cavity defined by said locking keys;

shearable means for retaining said keys in lock position; whereby, upon actuation of said squib, said charge will be ignited and exert gas pressure on said keys to effect shearing of said retaining wires and expulsion of said keys from their lock position to thereby release said male element from said female and disconnect the pair of connectible parts with the lock key outward movement being limited by said ferrule to thereby protect any surrounding structure from explosively propelled debris.

References Cited by the Examiner
UNITED STATES PATENTS

| | | | |
|---|---|---|---|
| 2,489,984 | 11/49 | Shoemaker | 89—1.5 |
| 2,872,870 | 2/59 | Gey | 102—39 X |
| 2,883,910 | 4/59 | Nessler | 89—1 |
| 3,010,747 | 11/61 | Bondon | 287—116 |
| 3,084,597 | 4/63 | Beyer | 89—1 |

BENJAMIN A. BORCHELT, *Primary Examiner.*

SAMUEL W. ENGLE, *Examiner.*